(12) United States Patent
Prasad

(10) Patent No.: US 9,032,086 B2
(45) Date of Patent: May 12, 2015

(54) DISPLAYING ANIMATED IMAGES IN A MOBILE BROWSER

(75) Inventor: Shyamal Prasad, Mountain View, CA (US)

(73) Assignee: Rhythm NewMedia Inc., Mountain View, CA (US)

( * ) Notice: Subject to any disclaimer, the term of this patent is extended or adjusted under 35 U.S.C. 154(b) by 694 days.

(21) Appl. No.: 13/344,922

(22) Filed: Jan. 6, 2012

(65) Prior Publication Data

US 2013/0111056 A1  May 2, 2013

Related U.S. Application Data

(60) Provisional application No. 61/553,091, filed on Oct. 28, 2011.

(51) Int. Cl.
| | | |
|---|---|---|
| G06F 15/16 | (2006.01) |
| G06F 17/30 | (2006.01) |
| H04L 29/08 | (2006.01) |
| H04N 21/442 | (2011.01) |
| H04N 21/472 | (2011.01) |
| H04N 21/6587 | (2011.01) |
| H04N 21/81 | (2011.01) |
| H04L 12/841 | (2013.01) |
| H04L 29/06 | (2006.01) |

(52) U.S. Cl.
CPC .......... G06F 17/30905 (2013.01); H04L 29/08 (2013.01); H04L 47/28 (2013.01); H04L 69/163 (2013.01); H04L 65/4084 (2013.01); H04L 65/80 (2013.01); H04N 21/44209 (2013.01); H04N 21/47202 (2013.01); H04N 21/6587 (2013.01); H04N 21/8153 (2013.01)

(58) Field of Classification Search
USPC ............... 709/231, 220, 223, 230, 217, 205
See application file for complete search history.

*Primary Examiner* — Lan-Dai T Truong
(74) *Attorney, Agent, or Firm* — Fenwick & West LLP

(57) ABSTRACT

A system and a method are disclosed for displaying animated images in a mobile web browser. The system requests to download a frame in a sequence of image frames, wherein the sequence of frames is extracted from a video clip with an inter-frame duration. The system then measures the downloading time for the frame. Next, the system displays the frame in the mobile web browser. The system also determines a next frame for downloading based on the inter-frame duration and measured downloading time of the displayed frame.

18 Claims, 7 Drawing Sheets

DISPLAYING ANIMATED IMAGES IN A MOBILE BROWSER

RELATED APPLICATIONS

This application claims the benefit under 35 U.S.C §119(e) of Provisional Application No. 61/553,091, filed Oct. 28, 2011, which is incorporated by reference.

BACKGROUND

1. Field of Art

The disclosure generally relates to the field of displaying animated images in a mobile web browser.

2. Description of the Related Art

Animated GIF files (Netscape, 1990s, Netscape Navigator 2.0) introduced the idea of putting a number of "frames" in a single file that could be played back successively at an inter-frame duration set in the file. Additionally, each frame could be used to update only a portion of the whole image to help in compression. This format, however, does not allow downloading images at a rate or bit encoding based on the observed network bandwidth.

JPEG format does not support animation, but using JavaScript to download a number of images and animate them is a widely used prior art. Most applications preload images all at once and use a JavaScript timer to playback the downloaded images. The concept of "streaming" the images in a network aware manner does not exist though.

Open source Java applets and JavaScript libraries are also widely available to support frame based animation. However, none of them addresses the issue of detecting network bandwidth to obtain the smoothest animation possible.

Network protocols such as Real Time Streaming Protocol (RTSP) use the concept of a media channel and a control channel. The control channel provides feedback to the server about the client's measurements of network performance. Transmission Control Protocol (TCP), on the other hand, starts a transmission to probe network capacity, and adjusts its transmission rate based on the observed behavior.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
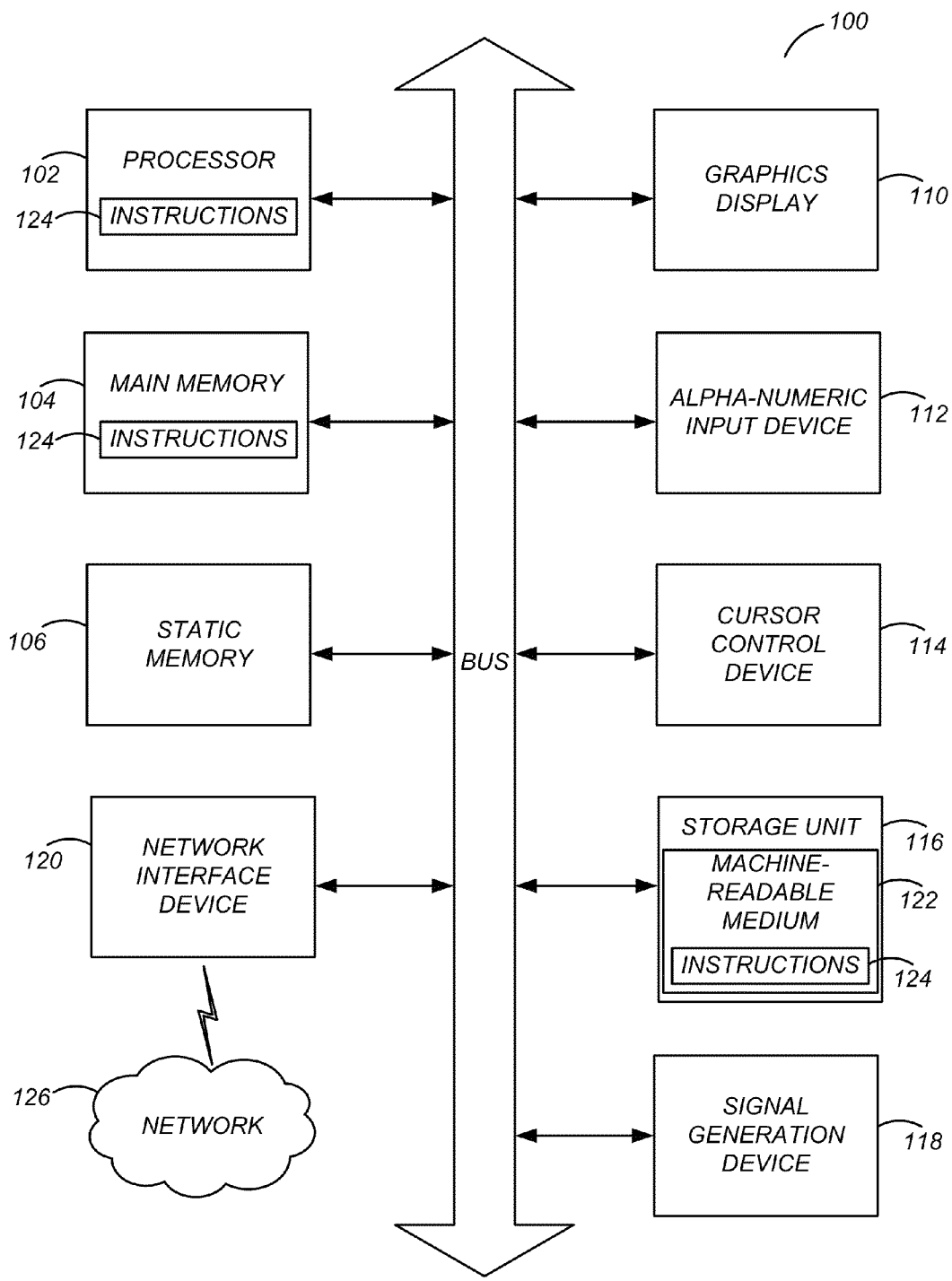
FIG. 1 illustrates one embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

One embodiment of a disclosed system (and a method and a computer readable storage medium) that includes displaying animated images in a mobile web browser with image generation, download, and display adapted to network conditions. The system requests to download a frame in a sequence of image frames, wherein the sequence of frames is extracted consecutively from a video clip with an inter-frame duration. The system then measures the downloading time for the frame. Next, the system displays the frame in the mobile web browser. The system also determines a next frame for downloading based on the inter-frame duration and measured downloading time.

Conventionally, a sequence of image files can be loaded by a web browser under the control of client side code typically written in JavaScript, sometimes in Java applets. These images can then be displayed sequentially in the browser to simulate a video or animation. The disclosed system extends this simulated animation with a network-aware flow control mechanism, which is implemented with standard built-in JavaScript capabilities of a mobile web browser. The web browser works with a server to simulate streamed video with image quality, image download, and display rate all optimized based on network conditions continuously measured by the system.

The following well-known techniques are combined in a novel manner to implement the system. First, the W3C Document Object Model (DOM) event model is used to control the rate of image transfer from a server to clients. Second, JavaScript is used to manipulate the DOM to simulate a video. Third, server software changes the quality of the images returned to the client based on the client's measurement of network bandwidth. In this way "near video" quality animation is achieved in a browser without a native video player with the best available "frame rate" possible for the available network bandwidth.

The disclosed system achieves the following advantages over the existing technologies. First, a preload period is set to get TCP slow start going in the application. Second, the standard DOM Image class event handlers determines load times of images while distinguishing between images in the browser cached and non-cached images. Third, standard DOM events are used to measure the performance of the network when downloading content. Fourth, the feedback of network performance can be communicated to a HTTP web server so that the server may optimize the content for the actual network conditions.

Computing Machine Architecture

FIG. 1 is a block diagram illustrating components of an example machine able to read instructions from a machine-readable medium and execute them in a processor (or controller) to implement the disclosed system for displaying animated images with adaption to network conditions. Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Animated Image Display System

Figure 2:
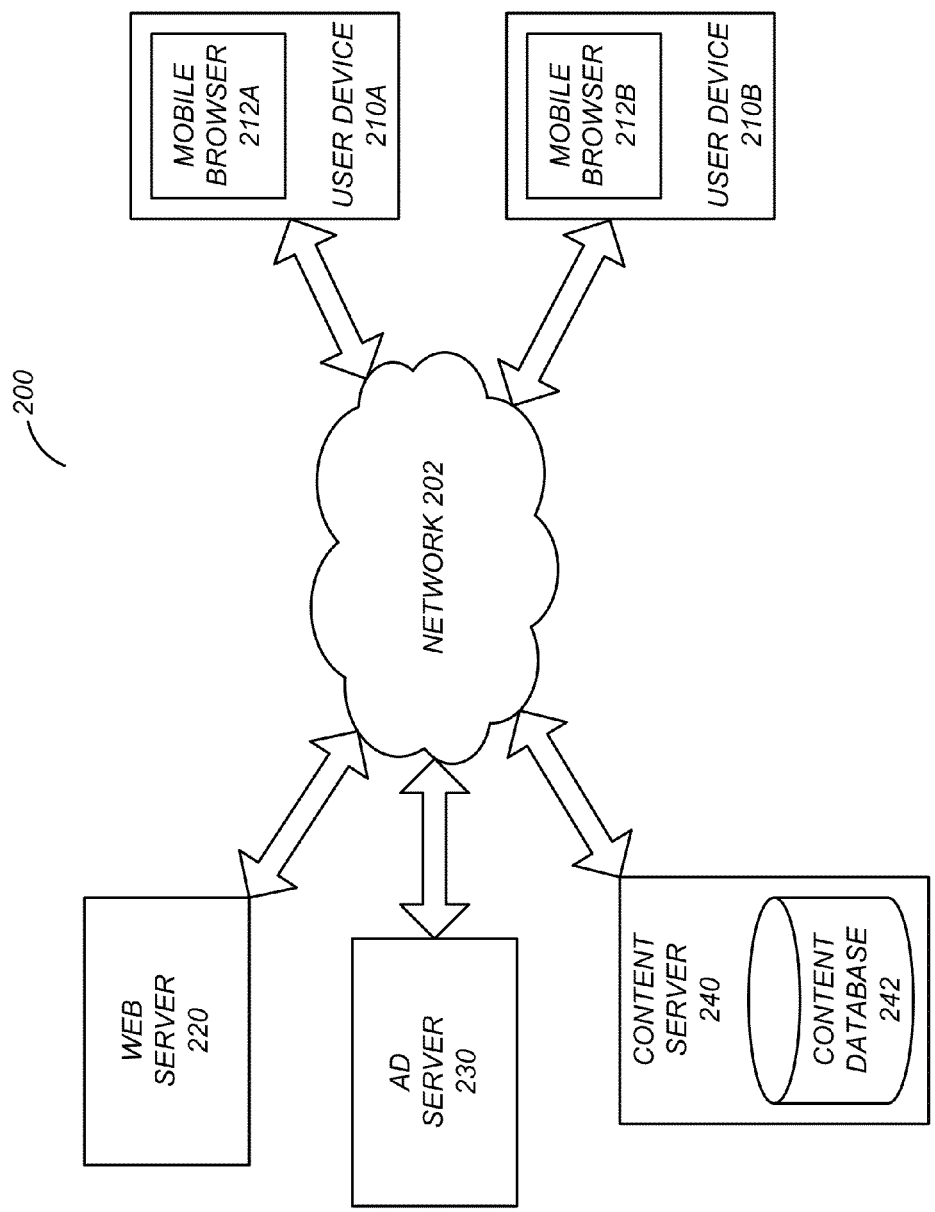
FIG. 2 illustrates a high-level block diagram of a communications environment for displaying animated images.

FIG. 2 illustrates a high-level block diagram of a communications environment 200 for displaying animated images. The environment 200 comprises a web server 220, an ad (advertisement) server 230, a content server 240, user mobile devices 210, and a network 202. The network 202 is a communication network that transmits data between the user mobile devices 210 and the servers 220, 230, and 240. In one embodiment the network 202 includes wireless network and the Internet.

The user mobile devices 210 are electronic devices with mobile web browsers 212 installed to access websites. The user mobile devices 210 may include netbooks, tablets, smart telephones, or personal digital assistants (PDAs). While only two user mobile devices 210A and 210B are illustrated in FIG. 2, the environment 200 may include thousands or millions of such devices. The mobile web browsers 212 are specific software applications running on mobile devices 210 for retrieving web content from the web server 220 and presenting the webpage inside the browser window. Since mobile devices 210 usually have limited computing power and wireless connections introduce longer latency, the web server 220 can send a simplified mobile version of the webpage to the mobile browsers 212 to reduce the data transfer rate.

In one embodiment, there may be advertisements in rich media format, such as images and videos, placed in the webpage. A universal resources identifier (URL) to the advertisements is often passed to the web browsers 212 by the web server 220. The web browsers 212 then request the advertisements from the ad server 230 addressed by the URL. The image and video content of the advertisement may in turn be stored on the content server 240, whose URL is passed to the web browsers 212 by the ad server 230. The web browsers 212 retrieve the content of the advertisement from the content server 240 and present the image and video to the user.

Figure 3B:
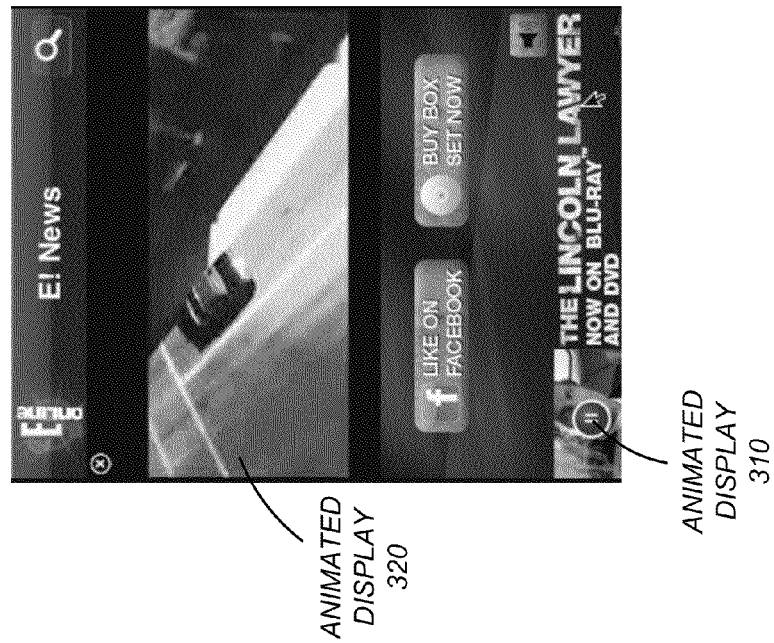
FIG. 3 illustrates one embodiment of displays of an example video advertisement in a mobile web browser.
Figure 3A:

FIGS. 3A and 3B illustrate example embodiments of display of a video advertisement in a mobile web browser. These figures provide a working example of the environment illustrated in FIG. 2. FIG. 3A illustrates a mobile browser window displaying a webpage with an ad banner 302 at the bottom promoting Blu-ray and DVD sales for a movie. In the left corner of the ad banner 310, a small window of animated display 310 of the movie trailer is being played as part of the advertisement. In FIG. 3B, the animated display 310 is expanded in response to a selection action taken on the animated display (e.g., a tap on a touch sensitive display). The expanded animated display 310 is initially paused from the smaller display and the movie trailer is played at full screen size in the animated display 320.

Referring again to FIG. 2, the web server 220, the ad server 230, and the content server 240 are typically formed of one or more computers, such as the computer system 100 shown in FIG. 1. While only one server is shown for each type of the servers in the environment 200 of FIG. 2, different embodiments may include multiple web servers, ad servers, or video servers operated by a single entity or multiple entities. In other embodiments, a single server may also provide different functionalities, such as delivering web content as a web server, as well as serving advertisements.

The content server 240 stores the advertisement content including images and videos in a content database 242. Since the content server provides advertisement content for the ad server 230, the database 242 may store a large volume of image and video files and serve a large amount of users. Depending upon the embodiment, the content database 242 may be a relational or other type of database. The database may be local to or remote from the content server 110.

Figure 4:
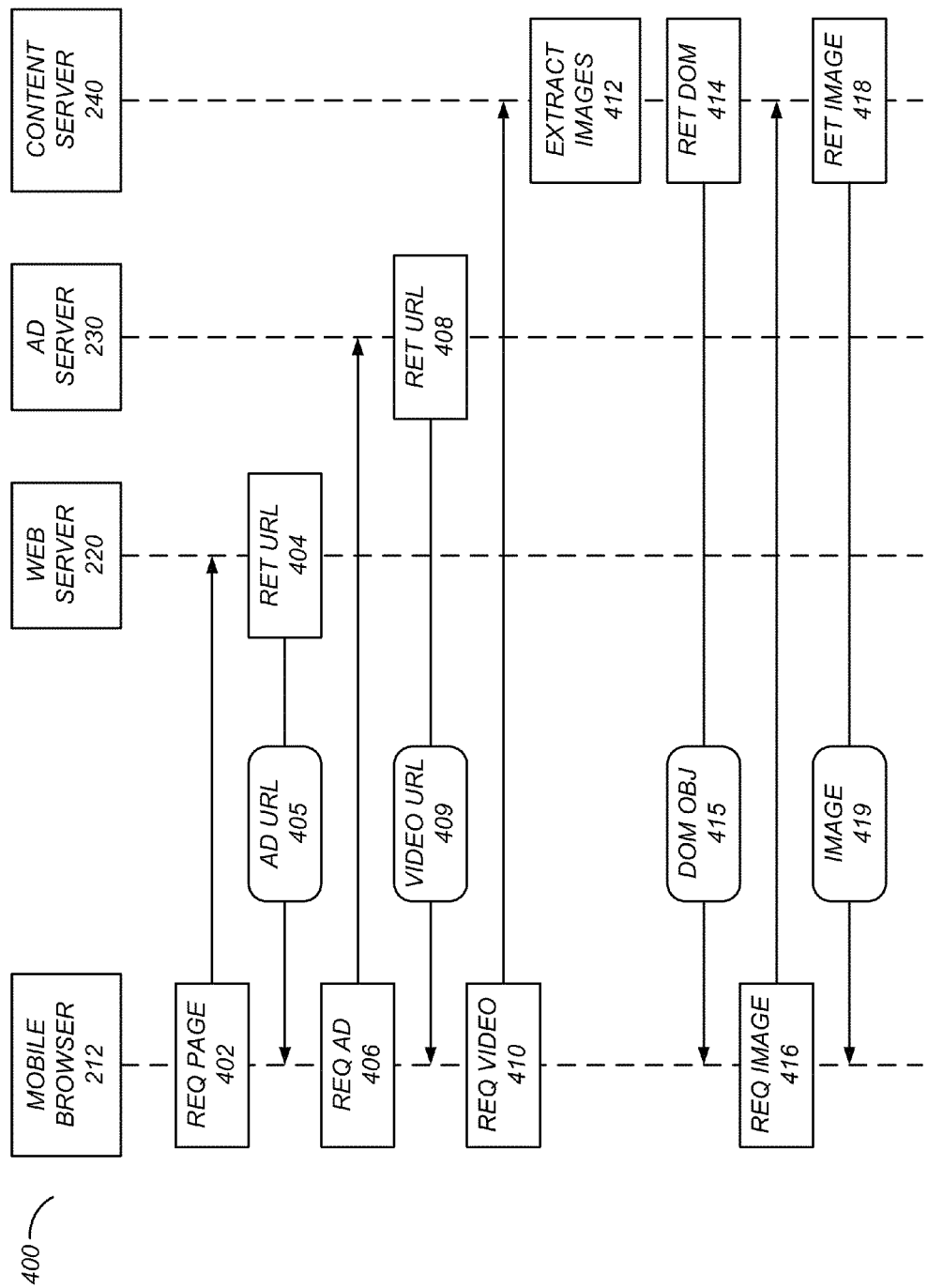
FIG. 4 illustrates one embodiment of an event trace in an example networked system for displaying animated images.

FIG. 4 illustrates one embodiment of data flows in an example system for displaying animated images adapted to network conditions. The system comprises a mobile browser 210, a web server 220, an ad server 230, and a video content server 240. The operation starts when mobile browser 210 sends a web page request 212 to web server 220, which returns the page with ad embedded 214. The mobile browser 210 then requests the ad from ad server 230, which in turn replies with the ad content with an URL to fetch the video embedded in the ad 224. Next, the mobile browser 210 sends a video request 232 to video content server 240. In response to the request, video content server 240 integrated with an image extraction unit prepares the sequence of frames extracted from the video and sends back a DOM object 234 including the JavaScript code for video playback logic and image frame settings to mobile browser 210. Subsequently, mobile browser runs the JavaScript code and starts requesting images 242 and receiving images 244 for playback.

Referring now to FIG. 4, there is shown an event trace of the basic operation of the animated image displaying system 200. The steps shown are intentionally high level and not intended to represent individual computer programming instructions or operations, but rather the system inputs, behaviors, and output of the system elements described above, as well as high level inter-process or inter-module communication. Those of skill in the art will appreciate the steps shown can be implemented in practice as multiple individual operations. Further, the animated image displaying system 200 operates at least in part asynchronously in an event driven manner, and thus the steps shown in FIG. 4 are to be understood as occurring in most cases in response to received signals or events, as will be clear from the context of the description.

The process generally starts with a mobile browser (e.g., mobile browser 212) requesting 402 a webpage from the web server 220. The web server 220 responds 404 to the client HTTP request with the webpage content, which in this case includes an ad URL 405 directed to an embedded video advertisement at the ad server 230. The mobile browser 212 then requests 406 the ad from ad server 230. The ad server 230 in response returns 408 the ad content including a video URL 409 pointing to the video embedded in the ad provided by the content server 240. Next, the mobile browser 212 sends 410 a request for the video to content server 240. The content server 240 integrated with an image extraction unit extracts 412 a sequence of frame images from the ad video.

The image extraction unit analyzes the video file to determine how many image frames can be extracted at a specified frame rate in a browser supported format (e.g. JPEG, GIF, and PNG et al.). For example, a total of 165 JPEG images can be extracted at the frame rate of 15 images per second from an 11-second MPEG-4 video clip. Images thus extracted are equally spaced at 66.67 ms apart. The extraction can be done by software applications, such as open source package FFMpeg.

The content server 240 integrated with the image extraction unit manages all video files and extracted images associated with each video file. The URL inside a client HTTP request is mapped to a respective video file, so that the mobile browser may request the sequence of video image frames directly, for example, image-001.jpeg to image-165.jpeg for the above 11-second MPEG-4 video clip. In one example embodiment all images are approximately the same size for a given image quality level. However, the system can be easily extended to support different image sizes for different frame.

The content server 240 returns 414 a DOM object 415 including an image frame settings and a JavaScript for controlling video playback and download logic to mobile browser 212. The JavaScript generated by the content server 240 is customized for each video. Next, the mobile browser invokes the JavaScript and requests 416 images and receives 418 back images 419 for playback.

Since the JavaScript code is associated with the video and has the knowledge of image frame settings, such as video frame rate and the total number of images extracted, it can compute an average inter-frame duration for playback. For example, 15 frames per second and a total of 165 extracted images for the 11-second MPEG-4 video clip translates to a 66.67 ms inter-frame duration. This inter-frame duration comprises a "frame tick", and multiples of this duration is represented by a number of "frame ticks".

The JavaScript code also maintains a "ticks per frame" (TPF) parameter for each image requested and downloaded from the content server 240. This TPF parameter is defined as the number of frame ticks it takes for the mobile browser 212 to download an image frame. For example, 2 TPF means it takes two frame ticks for the mobile browser to finishing downloading a frame. The JavaScript controlling logic for image playback and download is described in detail below.

Controlling Image Playback and Download

The JavaScript downloaded by the mobile browsers 212 from the content server 240 maintains two separate and independent processes, one to control the image playback, and the other to control the image download. In addition, the JavaScript maintains a periodic timer with a period equal to the average inter-frame duration. The inter-frame duration can be calculated from the original video frame rate and total number of image frames extracted by the content server 240. This timer period is also called the "frame tick," which serves as the basic unit for measuring time durations in the animated image display system. For example, a video clip of frame rate at 10 frames per second has a frame tick value of 100 ms long, and there are 10 frame ticks in each second.

Figure 5:
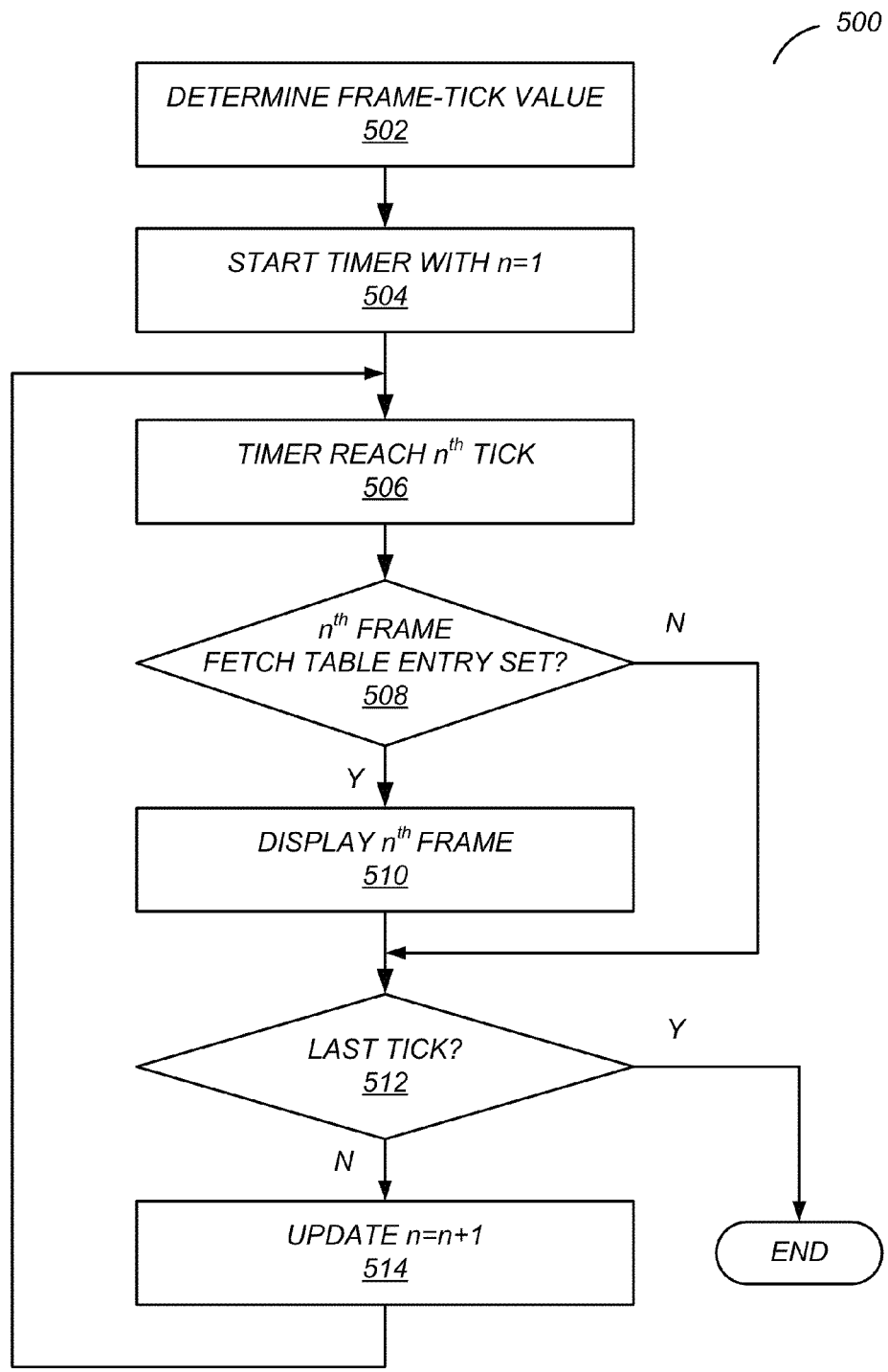
FIG. 5 illustrates one embodiment of an example method for controlling image playback performed by a mobile browser.

FIG. 5 illustrates one embodiment of an example method 500 for controlling image playback performed by the image playback process. First, the mobile browser 212 executes the JavaScript to determine 502 the frame tick value. The JavaScript code then initiates 504 the timer to drive the animated image display with a period equal to the frame tick value. Each time period is given a sequence number n starting from one. With each tick of the timer, the sequence number n is incremented by one. The timer sequence number n is also called the "current frame tick," because the $n^{th}$ frame tick corresponds to the $n^{th}$ image in the frame sequence, which is to be displayed at the beginning of the $n^{th}$ time period.

Since the image playback process runs independently from the image download process, the image playback process checks if an image frame is available before displaying it. A frame fetch table, indexed by the frame tick number, is maintained by the image download process to communicate the frame availability to the image playback process. For example, the $n^{th}$ entry in the table indicates the download status of the $n^{th}$ image frame. In one embodiment, the frame fetch table is implemented using a binary bit array. All the bits are initially cleared to indicate that none of the image frames are available. After an image has been downloaded and stored in the browser cache ahead of its playback frame tick, the corresponding bit is set to indicate that the image is available for playback.

Figure 6A:
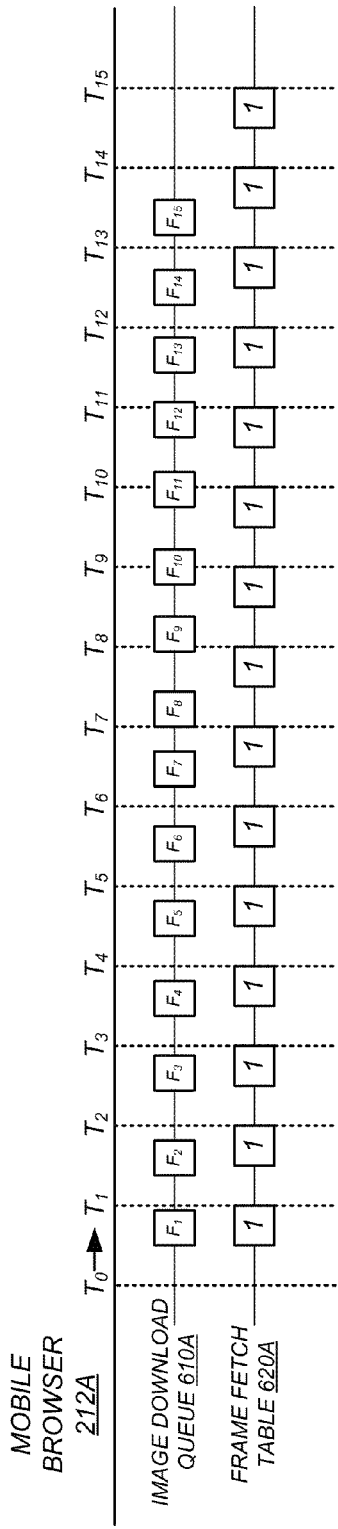
FIG. 6 illustrates one embodiment of an example of a frame queue and a frame fetch table maintained by a mobile browser.

Turning briefly to FIG. 6A, it illustrates an example embodiment of an image download queue 610A and frame fetch tables 620A maintained by mobile browsers 212. In this example, there are 15 frame images $F_1$ to $F_{15}$ extracted for the one second video clip, thus each frame tick is about 66 ms long. As describe above, the periodic timer triggers the playback of the animated images. However, the image download process updates the frame fetch table and requests for a next image once the current image download is finished. As shown in FIG. 6A, the time line of the image download queues 610A is asynchronous to the periodic timer. On the other hand, the entry status of the frame fetch tables 620A are shown at the end of each frame tick immediately before the playback process checks the image availability. For example, in FIG. 6A, the mobile browser 212A downloads each of the image frames $F_1$ to $F_{15}$ within one frame tick in an ideal scenario. Therefore, the frame fetch table 620A has all the entries set to one indicating that the playback process can display all the 15 images on schedule.

Referring back to FIG. 5, when the current frame tick turns 506 to n, the image playback process checks 508 the $n^{th}$ entry of the frame fetch table. If the table entry indicates that this image frame is available, the image playback process displays 510 the $n^{th}$ image in the animated display window (e.g., animated display 310 or 320 in FIG. 3). Otherwise, nothing changes in the animated display window. Next, the image playback process checks 512 whether the current frame tick is the last one. If so, the process terminates. Otherwise, the playback process increments 514 the frame tick by one and waits for the next timer tick.

Figure 6B:
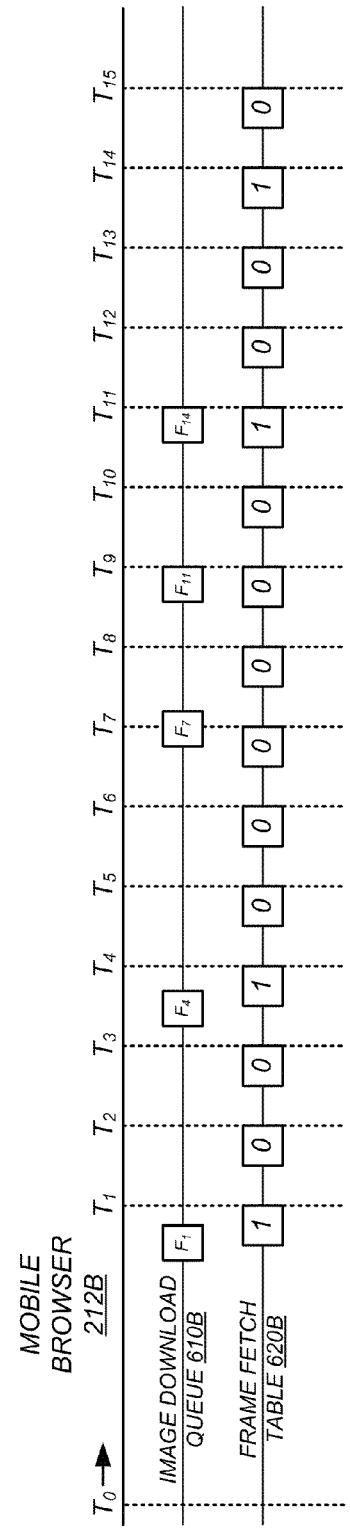

In one embodiment, before playback is started in the animated display window, the playback process waits for a preload period to buffer the first image. For example, as shown in FIG. 6, the preload starts at $T_0$ when the mobile browsers 212 request to download the first image in the frame sequence. This preload period may also overcome the bottleneck caused by the TCP slow start in case that the mobile browsers 212 request for all the image downloads during a single TCP connection.

Figure 7:
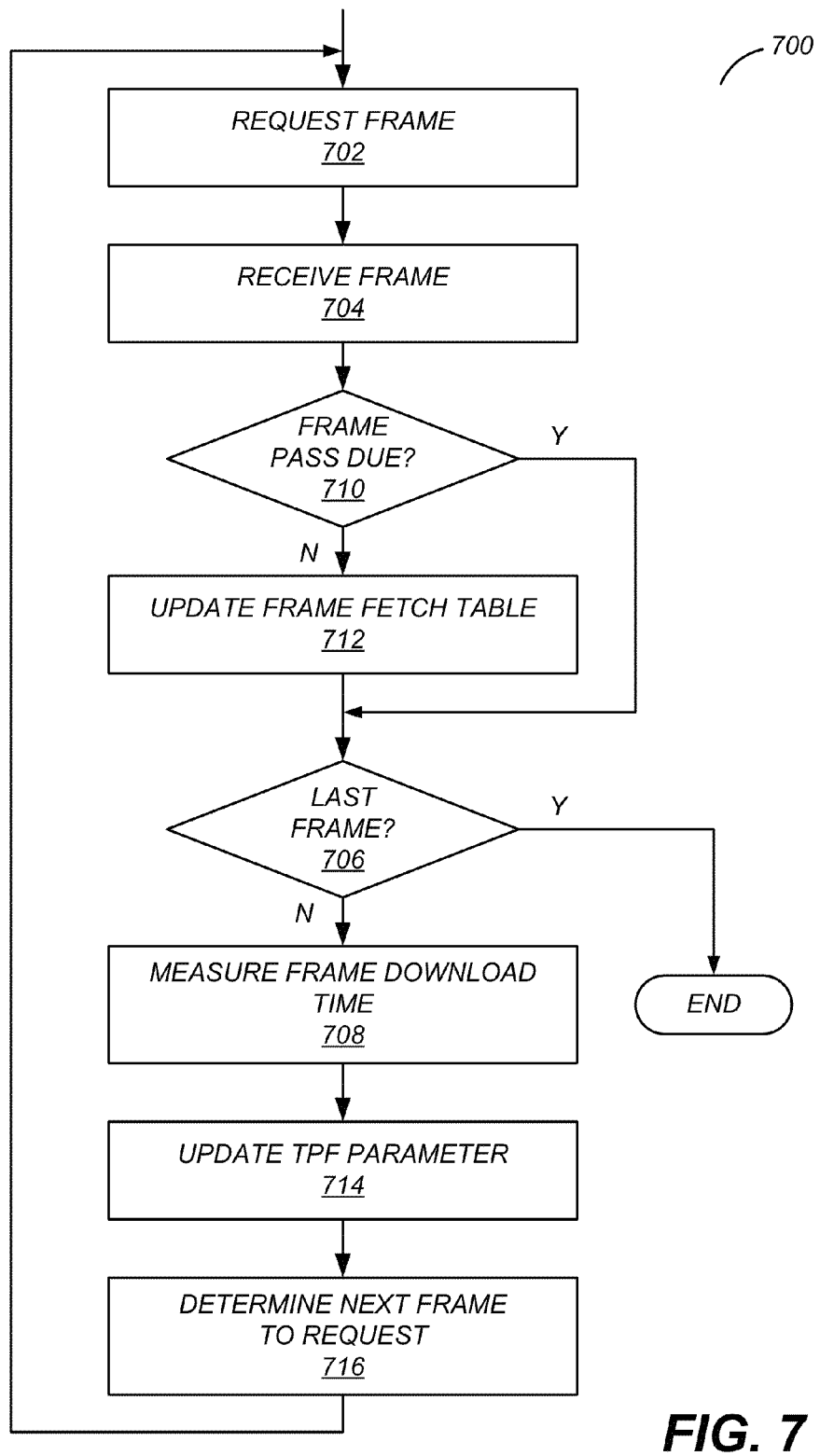
FIG. 7 illustrates one embodiment of an example method for controlling image download performed by a mobile browser.

FIG. 7 illustrates one embodiment of an example method 700 for controlling image download performed by a mobile browser. The image download process manages the download requests independent of the playback process, and download only one frame image at a time using the DOM Image interface to ensure that the animated images are displayed just as fast as they are downloaded.

The image download process starts by requesting 702 an image in the frame sequence. After receiving 704 the image, the download process checks 706 whether the image has passed its corresponding frame tick. If not, the frame fetch table is updated 712 indicating that the image has been downloaded and ready for playback in the due frame tick. Otherwise, there is no need to update the frame fetch table since the image has pass due. For example, in FIG. 6B, frame $F_7$ arrives after the frame tick $T_7$ is triggered. The corresponding entry in the frame fetch table 620B is not updated.

Next, the image download process checks if the image is the last frame in the sequence. If so, the download process terminates. Otherwise, the process measures 708 the frame download time, which is the duration in units of frame ticks since the request for the image was sent out. The download time is measured so that the TPF (tick per frame) parameter can be updated 714 accordingly.

The TPF parameter is used by the download process to determine 716 which next frame to request for download. The next image to request is the frame with the index equal to the current frame tick sequence number plus the TPF value. For example, in the FIG. 6B, the mobile browser 210B downloads the first frame $F_1$ in three frame ticks time starting from $T_0$. Assumes that the TPF parameter is set to three accordingly, the next image frame to request is 1+3=4. Therefore, after frame $F_1$ is downloaded, the process requests frame $F_4$ in order to get the fourth frame $F_4$ ready before frame tick $T_4$. There is no need to download frames in between because both $F_2$ and $F_3$ cannot be obtained before their respective playback frame tick is due, without the network connect speed being dramatically increased during a mere three frame ticks' time.

Hence, the TPF parameter takes into account the observed network condition to ensure that image downloads stay ahead of playback frame ticks. The TPF also allows the mobile browser to streamline the image downloads over a single TCP connection, taking advantage of the TCP congestion control and slow start. In one embodiment, when the download process starts, the initial value of the TPF parameter can be set to 1, assuming that the network connection is fast enough to support the full frame rate playback. The TPF parameter may also be adjusted based on the bandwidth of the network connection (e.g., WiFi, 3G, Long Term Evolution (LTE), or WiMax).

To update the TPF parameter, different smoothing functions can be applied based on the series of measurements of the frame download time. In one embodiment, an average of the previous TPF and the current measurement of download time is calculated and rounded to the smallest following integer. Note the TPF values are always integers equal to or greater than one. For example, in the FIG. 6B, the mobile browser 210B downloads the first frame $F_1$ in three frame ticks time resulting in the TPF being rounded to three. The TPF remains the same after the next frame $F_4$ is requested and downloaded in three frame ticks as well. As described above, frame $F_7$ arrives over three frame ticks later after frame tick $T_7$. Hence, the TPF is increased to four and next frame to request becomes frame $F_{11}$. At this point, the network connection speed improves so much that frame $F_{11}$ arrives within two frame ticks. The TPF is therefore smoothed to three and last frame in the video sequence to be downloaded is $F_{14}$.

In one embodiment, before requesting an image, the mobile browser checks if the image is already in the browser cache (e.g., from a previous session). The TPF is not updated in this case, since no image is downloaded. On the other hand, if the image is not in the browser cache at the time of requesting, the download time is measured and the TPF is updated. Operations in both of the cases can be implemented with the standard DOM model.

When the mobile browser requests an image in the frame sequence from the server, the request URL can include the frame number and the current value of the TPF parameter. In response to the image request, the content server can apply a smoothing function on the time series of the TPF parameter reported by the client. For example, a standard proportional-integral-derivative (PID) controller may be used to predict a smooth TPF value to avoid rapid changes or oscillations in the TPF values. In one embodiment, the content server may extract image frames at a quality based on the predicted ticks-per-frames value so that the perceived frame rate at the mobile browser can be maintained. Alternatively, the content server can simply extract all image frames at a fixed quality level, but the mobile browser displays the animated images at a slower frame rate when the network connection speed decreases. In one embodiment, during the preload period, the smoothing functions of the mobile browser and the content server collaborate to ensure that the TPF value converges at a close approximation of the network connection speed.

In some embodiments, the mobile web browser plays an audio stream along with the animated images. For example, an HTML5 supported browser allows an object model access to the audio stream position. In one embodiment, the audio stream is played back by the mobile browser in synchronization to the frame tick timer, which controls the playback of animated image frames as well. Alternatively, the mobile browser can control the image playback based on the time stamp in the audio stream instead of the frame tick timer. However, when the audio stream is played, the mobile browser usually establishes two separate TCP connections for audio and image downloads. This bandwidth sharing between the audio stream and the image frames may slow down the image download. A preliminary analysis shows that the frame rate indeed slows down to the point where the audio stream gets the required audio bandwidth because of TCP's fair sharing of capacity among connections.

The disclosed system achieves the following advantages. First, images are displayed sequentially in a mobile browser to simulate video or animation without the need to install any mobile video players. Second, a JavaScript code is used to manipulate a standard DOM event model to control the rate of image download and playback. The JavaScript code can also synchronize the audio stream playback with the image display based on the current frame tick value. The performance of the network connection is measured during the image download and a flow control mechanism is designed to adapt the frame rate of playback to the measured network performance. Third, the network performance can be communicated to the content server so that the server may optimize the quality of the images sent back to the client accordingly. In addition, a preload period can be set to get TCP slow start going before the playback starts. The standard DOM event handlers can also distinguish between the non-cached images and images in the browser cached to determine when to take the network measurement. Therefore, based on the client's measurement of network bandwidth, a "near video" quality animation is achieved in a mobile browser without native video players with the best available "frame rate" possible for the network bandwidth.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 4, 5, 6A, 6B, and 7) described herein may be performed, at least partially, by one or more processors (e.g., processor 102) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying animated images adapted to network conditions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for displaying animated images in a mobile browser, the method comprising:
   requesting to download an image with a first index number in a sequence of image frames by a mobile browser, the sequence of image frames extracted from a video file with an inter-frame duration;
   measuring the download time for the image with the first index number, the download time measured as a multiple of the inter-frame duration;
   maintaining a periodic playback timer that has a period of the inter-frame duration;
   displaying the image with the first index number in the mobile browser during the period corresponding to the first index number based on the periodic playback timer; and
   determining a next image with a second index number based on the measured download time and the first index number.

2. The method of claim 1, further comprising:
   recording all the measured download time of previously requested images in the sequence of frames;
   generating a smoothed value that is a moving average of all the previously measured download time; and
   calculating the second index number of the next image to request by adding the smoothed value to the first index number.

3. The method of claim 1, wherein the download time for the images in the sequence of image frames is measured as a multiple of the inter-frame duration.

4. The method of claim 1, wherein the periodic playback timer has a period of the inter-frame duration.

5. The method of claim 1, wherein the image with the first index number is displayed during a period corresponding to the first index number.

6. The method of claim 5, wherein the image with the first index number is not displayed if received after the period corresponding to the first index number.

7. The method of claim 1, wherein the second index number of the next image to request is determined by adding the measured download time to the first index number.

8. The method of claim 1, further comprising:
   recording all the measured download time of previously requested images in the sequence of frames;
   generating a smoothed value of all the measured download time; and
   calculating the second index number of the next image to request by adding the smoothed value to the first index number.

9. The method of claim 8, wherein the smoothed value is a moving average of the previously measured download time.

10. A method for displaying animated images in a mobile browser, the method comprising:
    requesting to download an image with a first index number in a sequence of image frames by a mobile browser, the sequence of image frames extracted from a video file with an inter-frame duration;
    measuring the download time for the image with the first index number;
    determining when to display the image the mobile browser based on a periodic playback timer; and
    determining a next image with a second index number to request based on the first index number and measured download time.

11. A non-transitory computer-readable storage medium storing executable computer program instructions for displaying animated images in a mobile browser, the computer program instructions comprising instructions for:
    requesting to download an image with a first index number in a sequence of image frames by a mobile browser, the sequence of image frames extracted from a video file with an inter-frame duration;
    measuring the download time for the image with the first index number;
    determining when to display the image the mobile browser based on a periodic playback timer; and
    determining a next image with a second index number to request based on the first index number and measured download time.

12. The non-transitory computer-readable storage medium of claim 11, wherein the download time for the images in the sequence of image frames is measured as a multiple of the inter-frame duration.

13. The non-transitory computer-readable storage medium of claim 11, wherein the periodic playback timer has a period of the inter-frame duration.

14. The non-transitory computer-readable storage medium of claim 11, wherein the image with the first index number is displayed during a period corresponding to the first index number.

15. The non-transitory computer-readable storage medium of claim 14, wherein the image with the first index number is not displayed if received after the period corresponding to the first index number.

16. The non-transitory computer-readable storage medium of claim 11, wherein the second index number of the next image to request is determined by adding the measured download time to the first index number.

17. The non-transitory computer-readable storage medium of claim 11, further comprising instructions for:
   recording all the measured download time of previously requested images in the sequence of frames;
   generating a smoothed value of all the measured download time; and
   calculating the second index number of the next image to request by adding the smoothed value to the first index number.

18. The method of claim 17, wherein the smoothed value is a moving average of the previously measured download time.

* * * * *